(12) United States Patent
Nishioka et al.

(10) Patent No.: US 7,065,518 B2
(45) Date of Patent: Jun. 20, 2006

(54) SEARCH SYSTEM

(75) Inventors: Shingo Nishioka, Higashimatsuyama (JP); Yoshiki Niwa, Hatoyama (JP); Toru Hisamitsu, Oi (JP); Makoto Iwayama, Tokorozawa (JP); Osamu Imaichi, Wako (JP)

(73) Assignee: Hitachi, Ltd., Tokyo (JP)

( * ) Notice: Subject to any disclaimer, the term of this patent is extended or adjusted under 35 U.S.C. 154(b) by 407 days.

(21) Appl. No.: 10/197,874

(22) Filed: Jul. 19, 2002

(65) Prior Publication Data
US 2003/0144999 A1    Jul. 31, 2003

(30) Foreign Application Priority Data
Jan. 31, 2002  (JP)  ............................ 2002-022677

(51) Int. Cl.
*G06F 17/30*    (2006.01)
(52) U.S. Cl. .................................. 707/3; 707/4; 707/10
(58) Field of Classification Search .................... 707/3, 707/4, 10
See application file for complete search history.

(56) References Cited

U.S. PATENT DOCUMENTS

| | | | | |
|---|---|---|---|---|
| 5,859,921 A * | 1/1999 | Suzuki | ......................... | 382/118 |
| 5,885,081 A * | 3/1999 | Tamura et al. | ............... | 434/169 |
| 6,321,191 B1 * | 11/2001 | Kurahashi | ....................... | 704/8 |
| 6,457,009 B1 * | 9/2002 | Bollay | ......................... | 707/10 |
| 6,571,241 B1 * | 5/2003 | Nosohara | ....................... | 707/6 |
| 6,603,764 B1 * | 8/2003 | Epley | ....................... | 370/395.1 |
| 6,721,736 B1 * | 4/2004 | Krug et al. | ..................... | 707/5 |
| 6,810,393 B1 * | 10/2004 | Okada et al. | ................... | 707/3 |
| 6,944,610 B1 * | 9/2005 | Moore et al. | .................. | 707/3 |
| 2003/0149686 A1 * | 8/2003 | Drissi et al. | ................... | 707/3 |

FOREIGN PATENT DOCUMENTS

JP    11-85786    9/1997

OTHER PUBLICATIONS

McIlarth, L.G. A low-power low-noise altrawide-dynamic-mage CMOS imager with pixel-paralled A/D Conversion, vol. 36, Isse: May 5, 2001, pp. 846-853.*

* cited by examiner

Primary Examiner—Jean M. Corrielus
Assistant Examiner—Baoquoc N. To
(74) Attorney, Agent, or Firm—Reed Smith LLP; Stanley P. Fisher, Esq.; Juan Carlos A. Marquez, Esq.

(57) ABSTRACT

A system for displaying the results of a search provided by one of two different search systems enabling continuous searching. One search system includes a search takeover data production command used to output search takeover data articles from the search. The other search system includes a search takeover data reading command used to read search takeover data. A document identifier correspondence table associates the identifiers specified in the search takeover data. When a user clicks a search system transfer instruction button in one search system, the search takeover data producing command is executed to produce search takeover data which is passed to the other search system. The latter search system regards the list of identifiers of articles which was passed by the search takeover data reading command as the search results, and thus operates continuously.

8 Claims, 16 Drawing Sheets

F I G. 2
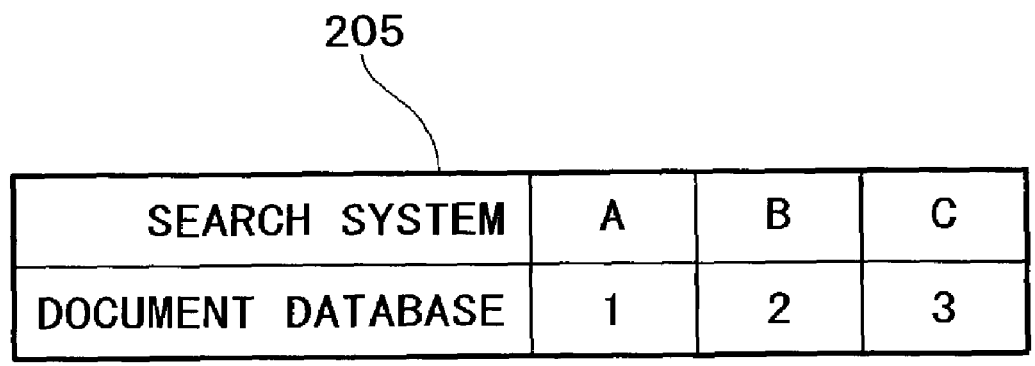

FIG. 5

DATABASE NAME : DB1

DOCUMENT 1 : id=5, score=100
DOCUMENT 2 : id=109, score=98
DOCUMENT 3 : id=36, score=84

...

| From \ To | DB1 | DB2 | Total |
|---|---|---|---|
| DB1 | 10 | 20 | 60 |

SEARCH SYSTEM INTERFACE A

File Edit View Go Communicator Help

Search [DATABASE 1 ▼] for [bace asp2] [Go]  [LONG QUERY]

+/- options are available example: xxx yyyy zzz

Show: [10 results ▼]  [SWISSPROT-today ▼]  [10 results ▼]

[Document Assoc]  INTERFACE B — 701
                  INTERFACE C — 702

Top 10 of found documents in SWISSPROT-today. Select some documents and click [Document Assoc] button.

☐ (1.00)>sp:BACE_MOUSE [P56818] BETA-SECRETASE PRECURSOR (EC 3.4.23.-) (BETA-SITE APP CLEAVING ENZYME) (BETA-SITE AMYLOID PRECURSOR PROTEIN CLEAVING ENZYME) (ASPARTYL PROTEASE 2) (ASP2).

☐ (0.99)>pu:BACE_RAT [P56819] BETA-SECRETASE PRECURSOR (EC 3.4.23.-) (BETA-SITE APP CLEAVING ENZYME) (BETA-SITE AMYLOID PRECURSOR PROTEIN CLEAVING ENZYME) (ASPARTYL PROTEASE 2) (ASP2) (MEMBRANE-ASSOCIATED ASPARTIC PROTEASE 2) (MEMAPSIN-2).

☐ (0.96)>sp:BACE_HUMAN [P56817] BETA-SECRETASE PRECURSOR (EC 3.4.23.-) (BETA-SITE APP CLEAVING ENZYME) (BETA-SITE AMYLOID PRECURSOR PROTEIN CLEAVING ENZYME) (ASPARTYL PROTEASE 2) (ASP2).

☐ (0.96)>pu:BACE_MOUSE [P56818] BETA-SECRETASE PRECURSOR (EC 3.4.23.-) (BETA-SITE APP CLEAVING ENZYME) (BETA-SITE AMYLOID PRECURSOR PROTEIN CLEAVING ENZYME) (ASPARTYL PROTEASE 2) (ASP2) (MEMBRANE-ASSOCIATED ASPARTIC PROTEASE 2) (MEMAPSIN-2).

☐ (0.85)>pu:BACE_HUMAN [P56817] BETA-SECRETASE PRECURSOR (EC 3.4.23.-) (BETA-SITE APP CLEAVING ENZYME) (BETA-SITE AMYLOID PRECURSOR PROTEIN CLEAVING ENZYME) (ASPARTYL PROTEASE 2) (ASP2) (MEMBRANE-ASSOCIATED ASPARTIC PROTEASE 2) (MEMAPSIN-2).

☐ (0.73)>sp:BACE_RAT [P56819] BETA-SECRETASE PRECURSOR (EC 3.4.23.-) (BETA-SITE APP CLEAVING ENZYME) (BETA-SITE AMYLOID PRECURSOR PROTEIN CLEAVING ENZYME).

☐ (0.44)>pu:ASP2_LACSN [P82655] ACID SHOCK PROTEIN 2 (FRAGMENT).

☐ (0.42)>sp:ASP2_STRTR [O30851] HEAT SHOCK PROTEIN HSP.16.4.

☐ (0.37)>sp:AAT2_ARATH [P46645] ASPARTATE AMINOTRANSFERASE, CYTOPLASMIC ISOZYME 1 (EC 2.6.1.1) (TRANSAMINASE A).

☐ (0.37)>sp:ASP2_BLAGE [P54958] ASPARTIC PROTEASE BLA G 2 PRECURSOR (EC 3.4.23.-) (ALLERGEN BLA G II).

SEARCH SYSTEM

BACKGROUND OF THE INVENTION

1. Field of the Invention

The present invention relates to a user interface for use in searching documents.

2. Description of the Related Art

Generally, a document search system includes a unique interface. Even when a general-purpose World Wide Web (WWW) browser can be used by utilizing a common gateway interface (CGI) technology, an operating procedure or a way of displaying the results of research differs from search system to search system. It can therefore be said that search systems (interfaces) are different from one another. Each search system is characterized by a value-added feature that may be a processing speed, a way of graphically displaying the results of search, or an ability to summarize the results of search. A user selects a search system, of which features are helpful for the user to most efficiently search intended information, according to the contents of search.

For example, assume that there are two different search systems for searching the same document database. Search system A can search for documents with reference to, in addition to a keyword, meta-information including an author of documents and a date of production. In contrast, search system B searches documents according to a keyword alone and has the ability to produce and display an overview of the results of search.

When search system A is used to search the document database, a user can effectively find a group of documents, which meets a search request, by designating the meta-information of a desired document. However, it is not easy for the user to summarize the documents. When a user uses the search system B to check the overview of the group of documents found by the search system A, the user can efficiently grasp the tendency of all the results of search and can thus acquire very valuable information.

As mentioned above, it is often very useful to display the results of search, which a user has acquired using the search system A, using the other search system B.

In such a case, conventionally, a user issues an appropriate query to the search system B. The results of search acquired by the search system A at that time are then reproduced. If a kind of search key is different between two different search systems, the reproduction is very hard to do. Supposing a kind of search key required by one search system matches a kind of search key required by the other search system, a feature for designating conditions for search or a search algorithm may be different. Thus, there is generally difficulty in reproducing the results of search, which have been acquired using a certain search system, using another search system.

SUMMARY OF THE INVENTION

Accordingly, an object of the present invention is to provide a method for displaying the results of search provided by one of two different search systems using the other search system so as to enable continuous searching.

According to the present invention, a transfer button for use in designating search system (interface) B, to which a user transfers and which the user allows to take over the results of search, is displayed by search system A.

The search system A includes a search takeover data producing means that is used to output a list of identifiers of articles on the results of search which is written in a format understandable by the search system B. The search takeover data producing means is used to produce search takeover data that specifies the results of search which the search system B takes over and which is reported to the search system B to which a user transfers.

The search takeover data specifies the list of articles on the results of search. In order to designate an article, an article identifier, a uniform resource locator (URL), or any other thing with which an article can be identified and which the transfer-destination search system B can receive is used.

When a user clicks the transfer button, search takeover data that describes the results of search displayed by the search system A is produced and passed to the transfer-destination search system B. At this time, if necessary, the transfer-destination search system (interface) is also activated.

The transfer-destination search system regards articles specified in the received search takeover data as the results of search. Thus, the search system takes over the results of search provided by the search system A.

According to the present invention, a means is needed for automatically activating a transfer-destination search system (interface) and for if the search system has already been activated, designating the search system. Moreover, a means is needed for passing search takeover data to the transfer-destination search system (interface). A practical method varies depending on a platform (OS) on which a search system interface is run. According to the present invention, a platform having the above means shall be employed.

Other and further objects, features and advantages of the invention will appear more fully from the following description.

BRIEF DESCRIPTION OF THE DRAWINGS

FIG. 2 shows a server-vs.-database correspondence table;

FIG. 5 shows a table that is created in order to take over the results of search;

FIG. 10 shows search system interface A from which a user transfers;

DETAILED DESCRIPTION OF THE PREFERRED EMBODIMENTS

An embodiment will be described with reference to the drawings below.

Figure 1:
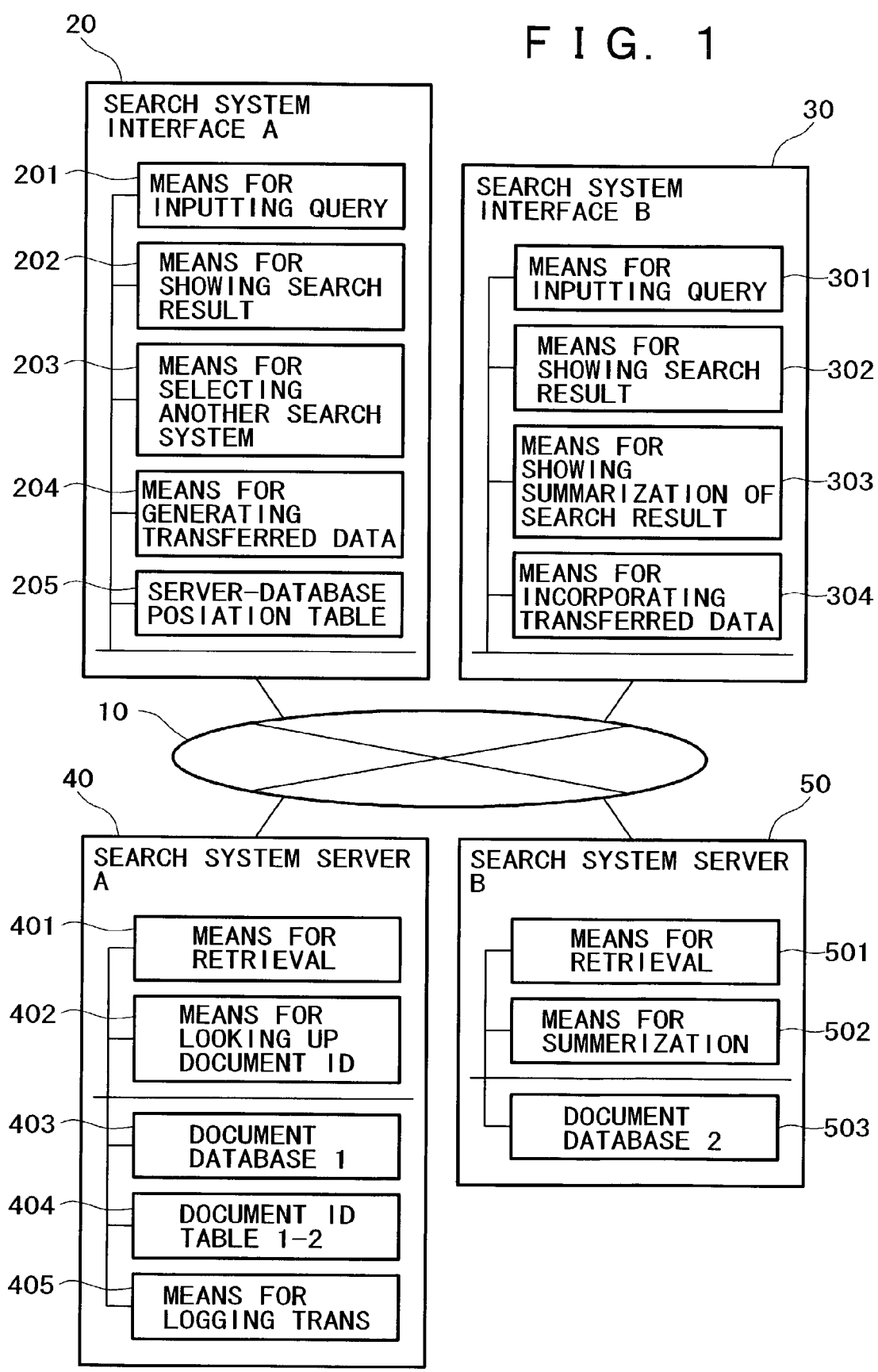
FIG. 1 shows an example of a basic configuration in which the present invention is implemented.

FIG. 1 schematically shows an example of a system configuration in which the present invention is implemented. The system consists mainly of search system interfaces 20 and 30, search system servers 40 and 50, and a network 10. The search system interfaces 20 and 30 are interfaces through which a user enters a search request or displays the results of search. The search system servers 40 and 50 execute search programs installed therein. The network 10 mediates in communications among the interfaces and servers.

The search system server 40 from which a user transfers includes a searching means, a document database that is an object of search, and a document identifier correspondence table. The document identifier correspondence table is used to associate document identifiers recorded in the document database with document identifiers recorded in a document database stored in a search system server to which the user transfers.

The search system server 50 to which the user transfers includes a searching means, a summarizing means, and a document database that is an object of search.

The searching means 401 or 501 included in the search system 40 or 50 searches the document database for a group of documents that exhibits a high degree of relevance to a search request which a user enters using a search request inputting means 201 or 301 included in the search system interface. The search system 40 or 50 then passes the group of documents to a results-of-search displaying means 203 or 304 included in the search system interface. The searching means is realized with, for example, a known keyword searching method. That is to say, a search request that is an input is a weighted set of words. The words are therefore regarded as weighted input keywords. Search is then carried out with the words ORed. At this time, the weight (degree of relevance) of a document to be searched for is calculated as mentioned below. For each word contained in both a search request and a document to be searched for, a weight (for example, frequency) of each word in the search request and a weight thereof in the document to be searched for are used to calculate a comprehensive weight (for example, a product between both the weights). The weights of all such words are added up (for example, a sum total of the weights is calculated), whereby the degree of relevance is obtained.

A summarizing means 502 included in the search system 50 summarizes the results of search. The term "summarizing" means that the results of search are displayed in a well-understandable manner. In this example, since a document is searched for, a set of words accurately expressing the contents of the document is regarded as a summary. As the summarizing means, an existing method described in JP-A No. 62963/1997 entitled "Method of Classifying Documents using Probability Model" can be adopted.

For instance, each document included in a group of documents to be summarized is divided into words, and the frequencies of the words are added up. Generally, a word that often appears in a group of documents represents the group of documents to a high degree. In other words, a word that appears in a group of documents at a high frequency is likely to be contained in a summary. However, a word that often appears in any document, such as, "perform" is inappropriate as a word for a summary. Therefore, normally, a word for a summary is selected in consideration of the frequency of appearance in a document database in which a group of documents is recorded. Specifically, a word whose frequency of appearance in a designated group of documents is high and whose comprehensive frequency of appearance in a document database is low is a characteristic word because it appears only in the group of documents concerned. The word is an appropriate word for a summary that characterizes the group of documents. More particularly, a function to which the frequencies of appearance at which words contained in a group of documents appear in the group of documents, and the frequencies of appearance thereof in a document database are assigned is used to calculate the weights of the words. Words whose weights are equal to or larger than a certain threshold are adopted as words for a summary.

The search system interface 20 from which a user transfers includes a search request inputting means, a results-of-search displaying means, a search system transferring means, and a search takeover data producing means.

Figure 3:
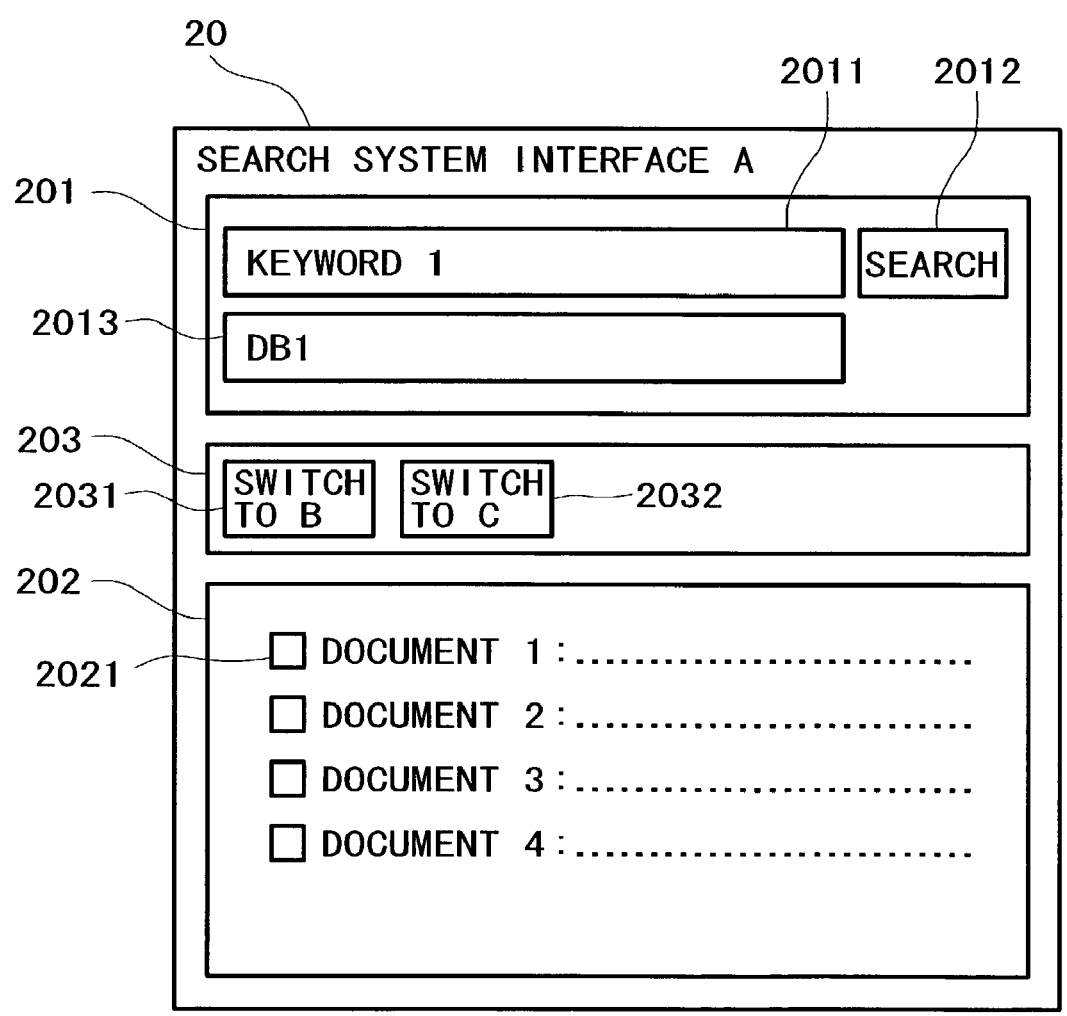
FIG. 3 shows an example of a structure of a search system interface.

FIG. 3 shows an example of a search system interface from which a user transfers. A user uses a document database selector 2013 to designate a document database to be searched, enters a search request in a keyword input box 2011, and clicks a keyword search instruction button 2012. Search is then carried out. The results of search are displayed using the results-of-search displaying means 203. The contents of documents that are the results of search can be browsed by clicking a browse button 2021. In this example, "DB1" is designated as a document database that is an object of search, and "keyword 1" is entered as a search request. The results of search performed under these conditions are displayed.

The search system interface 30 to which the user transfers includes a search request inputting means, a results-of-search displaying means, a summary displaying means, and a search takeover data reading means.

Figure 4:
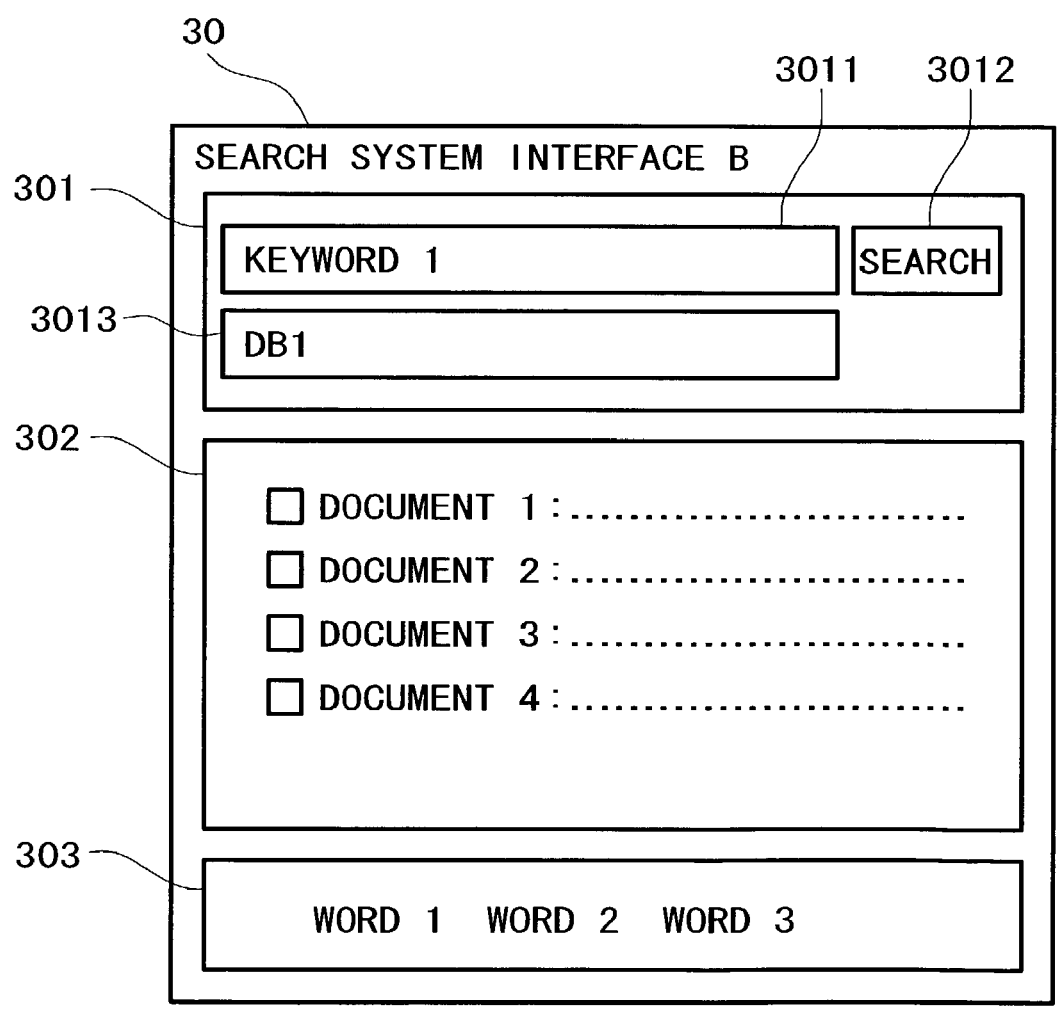
FIG. 4 shows an example of a structure of a search system interface having a summary displaying feature.

FIG. 4 shows an example of a search system interface to which the user transfers. A user uses a document database selector 3013 to designate a document database to be searched, enters a search request in a keyword input box 3011, and clicks a keyword search instruction button 3012. Search is then started. The results of search are displayed using a results-of-search displaying means 302. The results of search are displayed by a summary displaying means 303. The contents of documents that are the results of search can be browsed by clicking a browse button 3021. In this example, DB1 is designated as a document database that is an object of search, and keyword 1 is entered as a search request. The results of search performed under these conditions are displayed.

Through the search system interface 20 from which the user transfers, the user selects and clicks a search system transfer button 2031 associated with a transfer-destination search system interface. Consequently, the user transfers from one search system to another search system. At this time, the results of search displayed through the search system interface 20 are taken over to the transfer-destination search system interface, and displayed in a screen image representing the search system interface. Furthermore, when the transfer-destination search system interface has a summary displaying feature or the like, a summary is created and displayed as if the search system interface searched documents.

For example, assume that the search system transfer button 2031 shown in FIG. 3 is a transfer button allowing a user to transfer to the search system including the interface represented by the screen image shown in FIG. 4. When the button is clicked, the results of search corresponding to the results of search displayed by the search system as shown in FIG. 3 are displayed by the transfer-destination search system as shown in FIG. 4. In this example, the search system including the interface represented by the screen image shown in FIG. 4 has a summary displaying means. Therefore, the results of search are summarized and displayed by a summarizing means.

Figure 6:
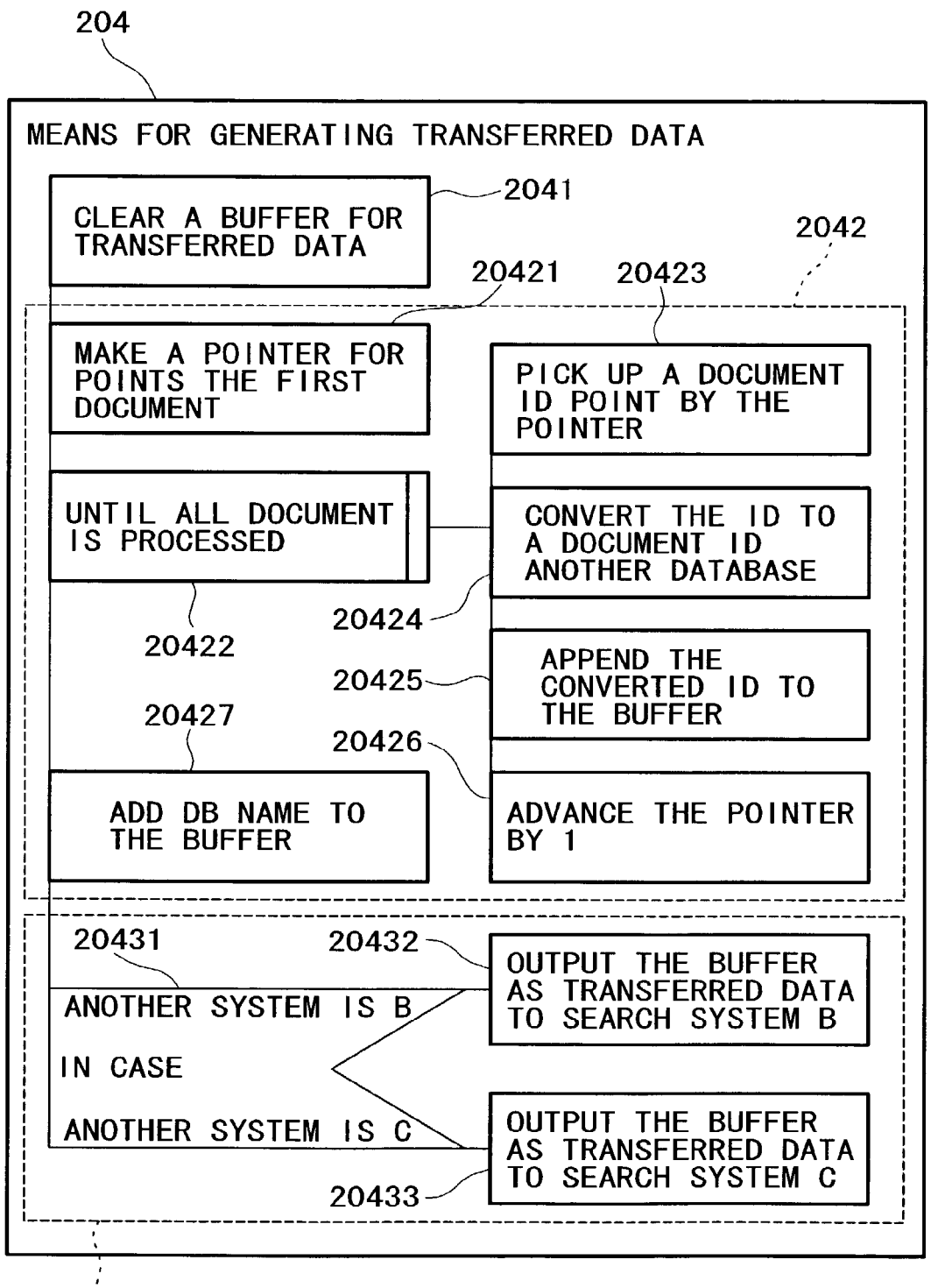
FIG. 6 describes a search takeover data producing means.
Figure 7:
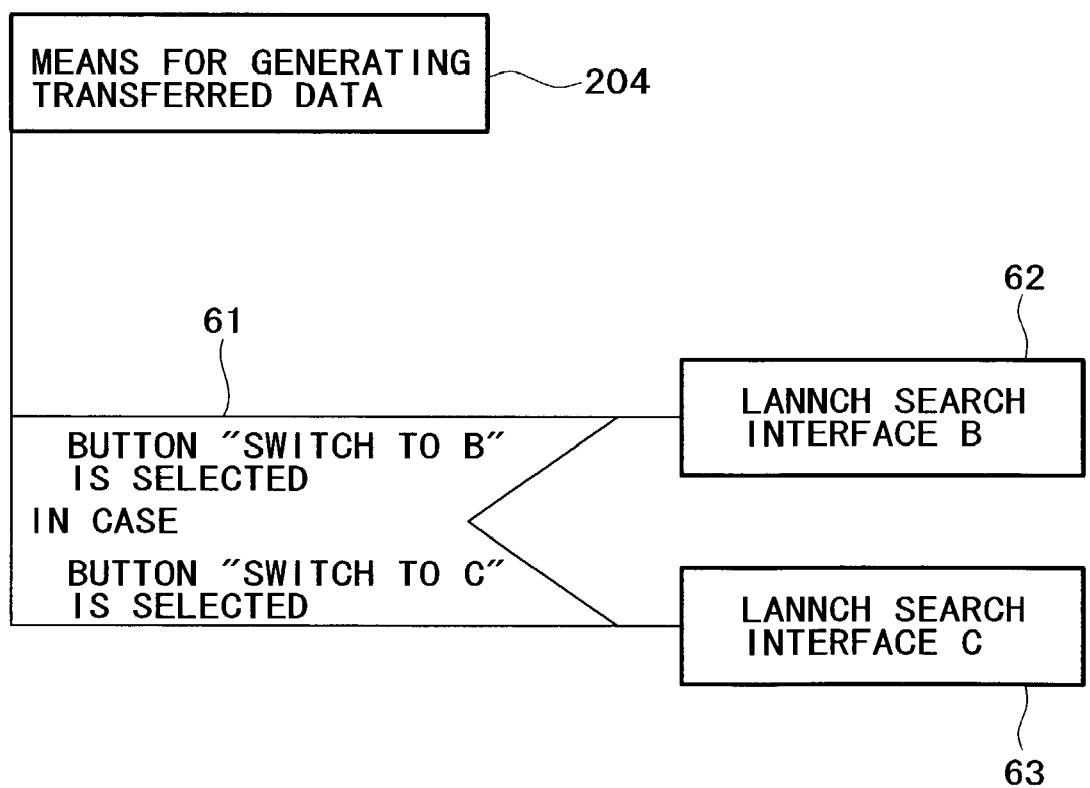
FIG. 7 describes a search takeover data writing means.

Next, how a user transfers one search system to another will be described by taking the above example. When a user clicks the search system transfer button 2031, transfer is started. First, a document identifier reading means 2041 (FIG. 6) included in a search takeover data producing means 204 is used to read a database name that is an object of search, and a list of identifiers of documents, which are the results of search, from the results-of-search displaying means. The read database name and identifiers of documents that are the results of search are converted into an associated database name employed in the transfer-destination search system, and associated document identifiers employed therein. In order to convert the read database name and document identifiers into the associated database name and document identifiers, a document identifier correspondence querying means 2042 passes the database name employed in the transfer-destination search system and the document identifiers employed therein to a document identifier associating means 402 included in the search system server. When the document identifier associating means 402 receives the associated name and identifiers, an interface is attained. Thus, search takeover data is produced to specify the associated database name and document identifiers that are employed in the transfer-destination search system.

A document identifier correspondence table 404 lists identifiers of articles recorded in document database 2 in association with identifiers of articles recorded in document database 1. The document identifier associating means 402 included in the search system server references the document identifier correspondence table 404 using the received transfer-destination system name, database name, and document identifier. Consequently, the document identifier associating means 402 retrieves the associated name of document database 2 and the associated identifiers of the articles on documents recorded in the document database 2.

The identifiers of documents that are the results of search can be readily collected from data held in the results-of-search displaying means 202.

Incidentally, the document identifier correspondence table may be included in the transfer destination. In this case, identifiers employed in the document database 1 are specified in search takeover data. A search takeover data reading means included in the search system interface B is used to convert the document identifiers. Intermediate identifiers independent of a document database may be adopted as the document identifiers. Using the intermediate identifiers, the search takeover data can be readily produced. In this case, the correspondence table must be included in a system having a document database in which identifiers different from the intermediate identifiers are employed. In a special case where document identifiers are used in common among all systems or the document identifier correspondence table is not needed for association, the document identifier correspondence table may be excluded.

Incidentally, when a database can be identified from document identifiers, a database name may be excluded from search takeover data.

When a user can transfer from one interface, like the interface shown in FIG. 3, to any of a plurality of different interfaces, the format of a search takeover table or a procedure of calling a transfer-destination interface is different from transfer destination to transfer destination. An action to be performed according to the search takeover data producing means must therefore be changed based on a transfer destination. Specifically, actions to be performed according to a document identifier correspondence querying means 2042 and a search takeover data writing means 2043 must be changed.

The server of each transfer destination and a procedure of activating the server must be able to be identified using the search system transfer instructing means 203. Moreover, data produced according to the search takeover data producing means must be passed to a transfer-destination system according to an appropriate procedure designated using the search system transfer instructing means 203. The information required is described while being directly associated with the transfer instruction buttons 2031 and 2032. A user selects either of the buttons so as to designate appropriate information and a processing means for performing successive processing.

Another procedure for installing a transfer-destination interface is such that transferring procedures are described separately and a correspondence table listing the descriptions of transferring procedures in association with transfer destinations is created. When a transfer instruction button is clicked, an associated description of a transferring procedure and an associated transfer destination are retrieved from the correspondence table, and interpreted. Thus, this procedure using a common means independently of a transfer destination may be adopted.

Using the document identifier correspondence querying means 2042, associated identifiers must be varied depending on a transfer destination. Therefore, first, a server-vs.-database correspondence table 205 is referenced (FIG. 2). Consequently, if a transfer destination is server B, an associated database is document database 2. If a transfer destination is server C, an associated database is document database 3. Thus, a database included in a transfer destination can be identified. A transfer-destination server name and a database name are designated in order to call a document identifier associating means included in server A. Thus, document identifiers are correctly converted into document identifiers employed in a database included in a transfer-destination server.

Likewise, using the search takeover data writing means 2043, a format in which appropriate data is written must be selected according to a transfer destination. In this example, writing means 20432 and 20433 are dedicated in advanced to transfer destinations B and C respectively. A writing means 20431 is used to select either of the writing means 20432 and 20433 according to a transfer destination. Thus, writing actions are changed.

Incidentally, a common means may be used to define writing actions, interpret them, and execute any of them. Thus, action definitions may be changed in order to perform a different action. Eventually, a transfer destination may be installed. Furthermore, if the structure of takeover data is used in common, it is unnecessary to vary a writing format depending on a transfer destination. A single writing means should merely be adopted.

When the search system interface B is activated, if search takeover data is received through the search system interface (FIG. 5), the search takeover data is passed to the search takeover data reading means 304. Article identifiers are then retrieved from the search takeover data passed to the search takeover data reading means 304, and converted into identifiers of the same format as the results of search provided by the searching means. The resultant identifiers are passed to the search system server B 50. The search system server B does not use a searching means but regards the received list of article identifiers as the results of search and performs succeeding actions normally. In other words, the results of search are passed to the summarizing means 502. A summary is then created. Finally, the results of search and summary are passed to the search system interface B 30. The results-of-search displaying means 302 and summary displaying means 303 are used to display the results of search and summary respectively. Thus, transferring from one search system to another is completed.

Figures 8, 9:
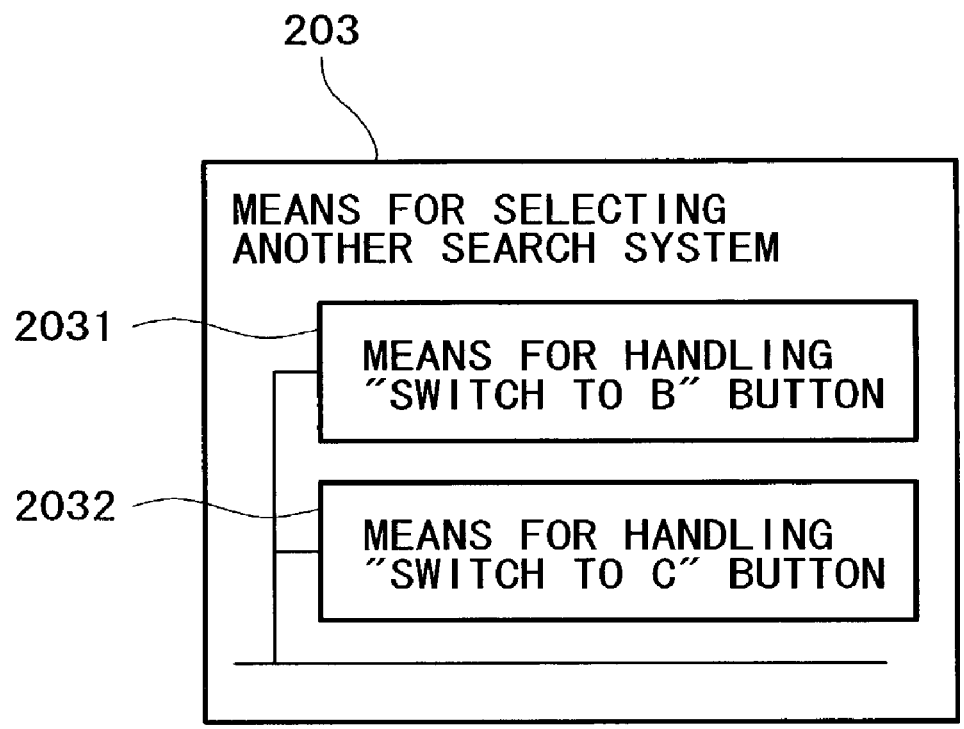
FIG. 8 describes a search system transfer instructing means.
FIG. 9 shows a search takeover record table.

FIG. 9 shows a search takeover record table 405 that is managed by the search system server A. In this example, the number of times by which the document database 1 is searched, and the number of times by which the results of search performed on the document database 1 are taken over in order to transfer from the search system interface A to the search system interface B that includes the document database 2 are counted and recorded in the table 405. The former number of times is recorded in association with a row DB1 and a column DB1, and the latter number of times is recorded in association with the row DB1 and a column DB2.

In the present embodiment, the document identifier correspondence table included in the search system server A is used to convert identifiers specified in search takeover data. Therefore, the search system server A monitors a request issued through the search system interface A so as to learn what action is performed through the search system interface A performs. Specifically, if normal search is performed through the search system interface A, a search request is issued to the searching means 401. If the search system transfer button 2031 included in the search system interface A is clicked in order to transfer the search system to another, since document identifiers are converted, a query about a database name and correspondence of document identifiers is issued. If the search request is issued, the value representing the number of times by which the document database 1 is searched is incremented by one. If the query is issued, the value representing the number of times by which the search system interface is transferred from the interface A to the interface B is incremented by one.

In the above example, the takeover identifier correspondence table is stored in the server A, the number of times by which transfer is made can be counted according to the foregoing method. If the identifier correspondence table is stored in a search system server of a transfer destination or if the identifier correspondence table is unnecessary, a query about conversion of identifiers is not issued. The foregoing method cannot therefore be adopted. In this case, through the search system interfaces, the search system servers are notified of the fact that one search system has been transferred to the other search system.

The search system server B may also count the aforesaid numbers of times according to the same method. When the numbers of times counted by the search system server A and the numbers of times counted by the search system server B are integrated with each other, more detailed information can be obtained.

By utilizing information concerning transferring from one search system to another which is acquired as mentioned above, user's likes concerning a search system can be learned. This may contribute to improvement of services.

Figure 11:
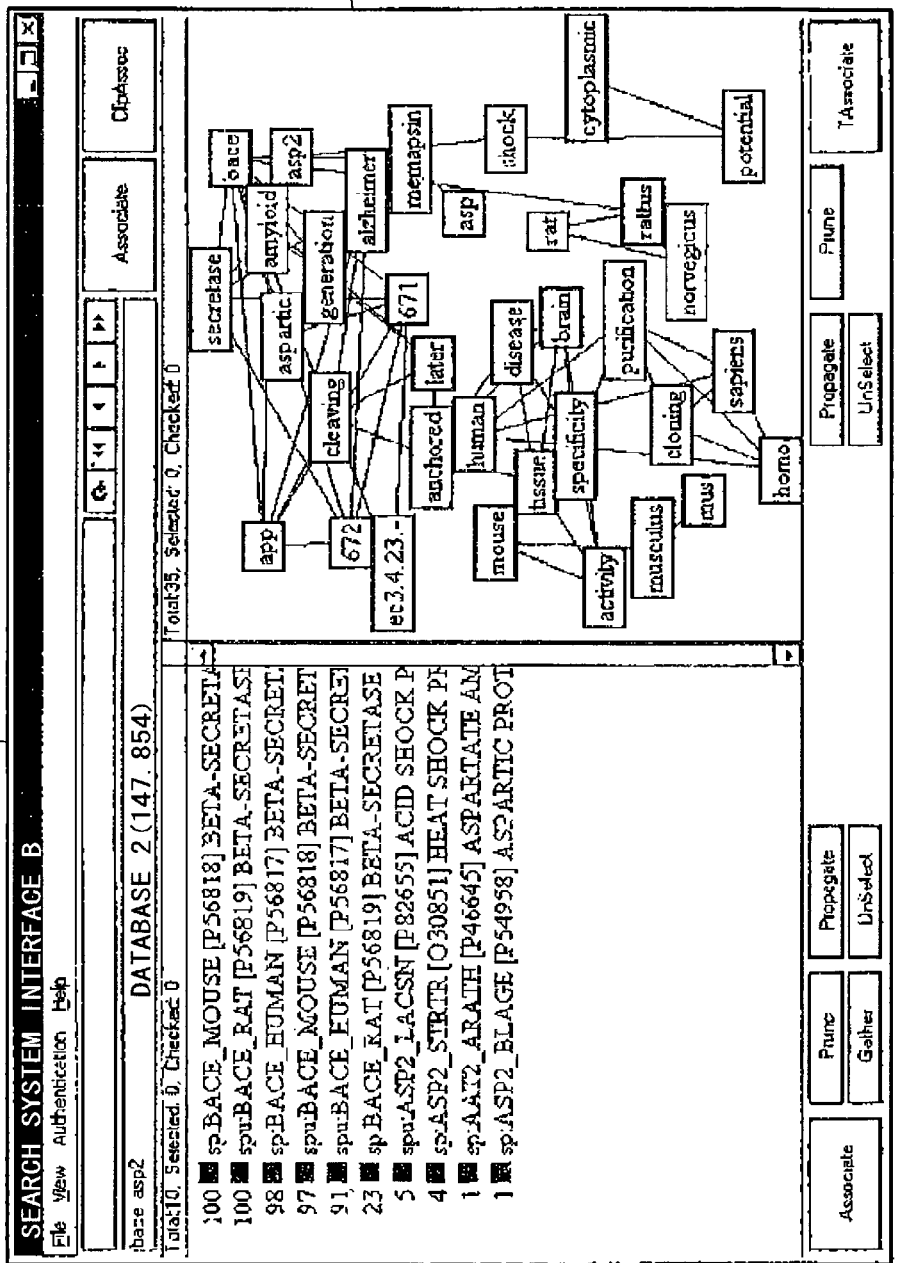
FIG. 11 shows search system interface B to which the user transfers (immediately after the transfer)
Figure 12:
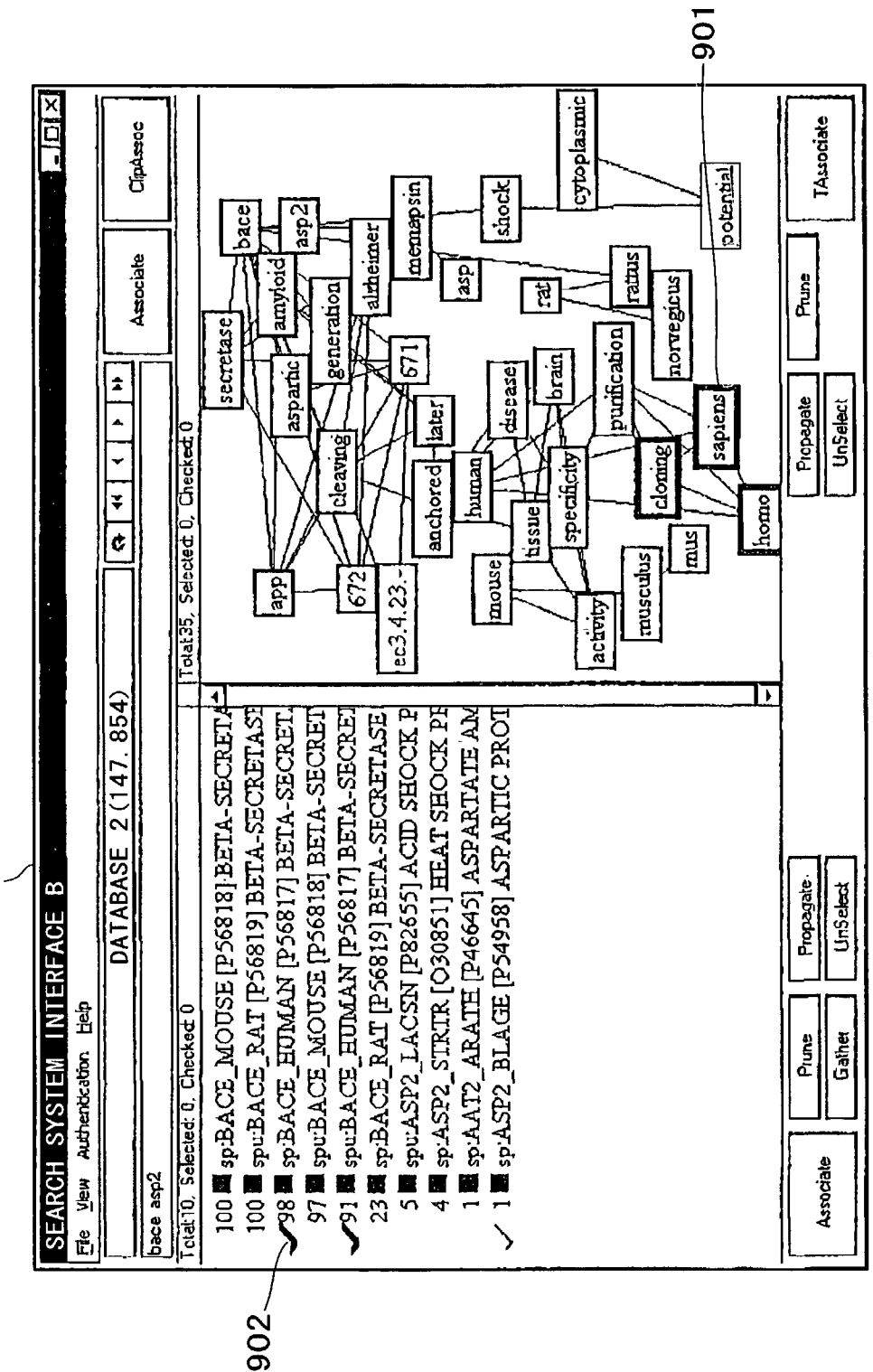
FIG. 12 shows the search system interface B to which the user transfers (after operation)

FIG. 10, FIG. 11, and FIG. 12 are concerned with a case where the present invention is implemented in a search service that is rendered using a system in which a summary of the results of search can be displayed through a search system interface included in a transfer destination. In this case where a search service is rendered, a search system interface A 70 shown in FIG. 10 is included in a transfer source. The search system interface A is so simple that titles of documents that are the results of search are displayed and a user is prompted to select any of the titles so as to browse the text of the selected document.

When a button 701 Interface B included in the search system interface A 70 shown in FIG. 10 is clicked, a search system interface B 80 shown in FIG. 11 is activated.

Referring to FIG. 11, ten articles searched through the search system interface A 70 shown in FIG. 10 are taken over to the search system interface B and displayed in the left half 801 of a screen image representing the interface B. Through the search system interface B, a summary of the ten articles is created and displayed in the right half 802 of the screen image representing the search system interface B. In this search service, the search system interface B shown in FIG. 11 is activated while taking over the results of search from the transfer-source search system interface A 70. In this state, the original features of the search system interface B 80 can be used. For example, three words "cloning," "sapiens," and "homo"(901) may be selected from the summary, and a check mark (902) may be, as shown in FIG. 12, assigned to the titles of documents containing the words.

Figure 13:
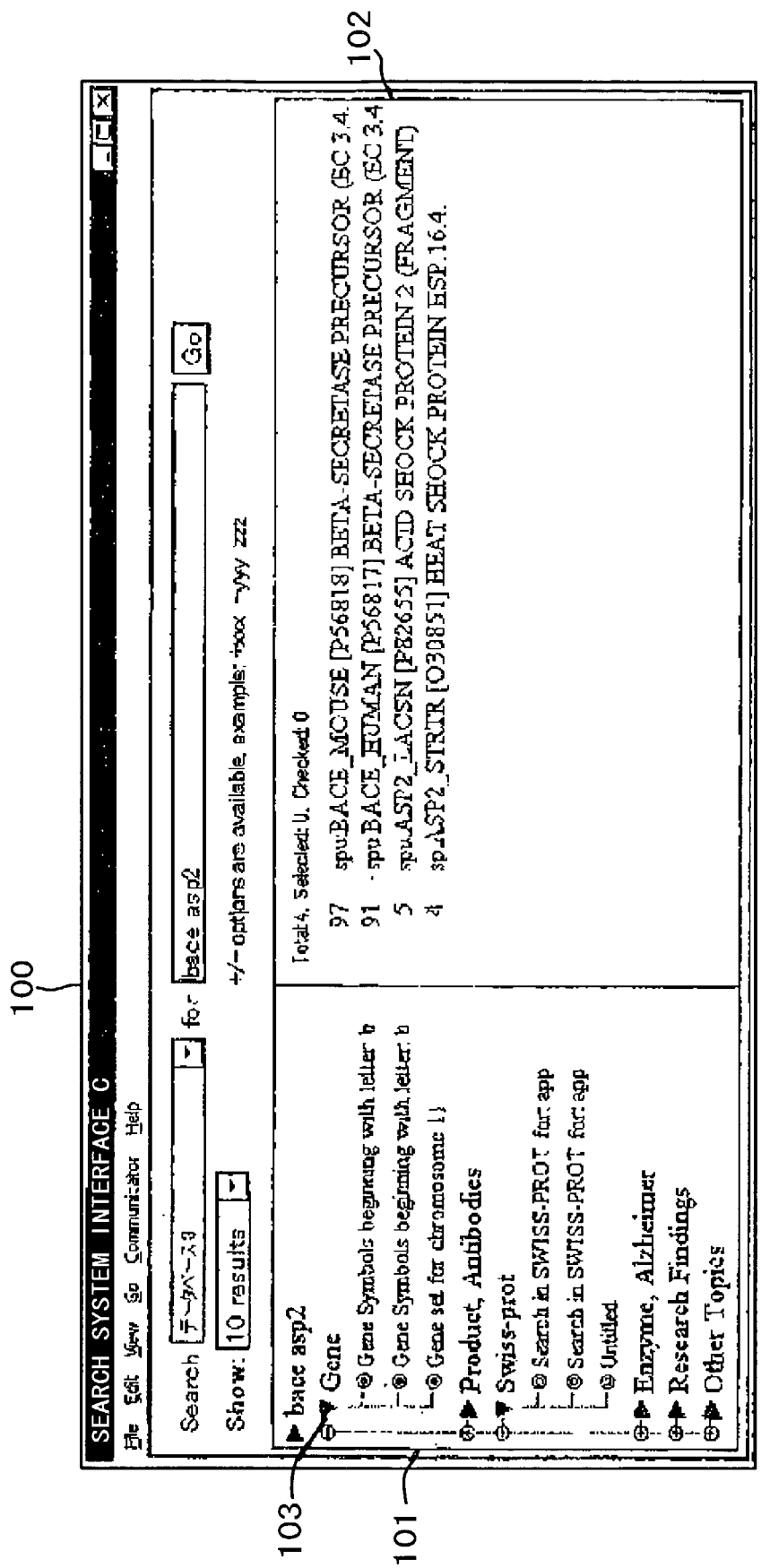
FIG. 13 shows search system interface C to which the user transfers.

FIG. 10 and FIG. 13 are concerned with a case where the present invention is implemented in a search service that is rendered using a system in which through a search system interface included in a transfer source, the results of search are clustered and displayed hierarchically.

The search system interface A 70 shown in FIG. 10 is included in a transfer source. The search system interface A is so simple that titles of documents that are the results of search are displayed through the search system interface A, and a user is prompted to select any of the titles so as to browse the text of the selected document.

When a button 702 Interface C included in the search system interface A 70 shown in FIG. 10 is clicked, a search system interface C 100 shown in FIG. 13 is activated.

Referring to FIG. 13, ten articles searched through the search interface A 70 shown in FIG. 10 are clustered, and the hierarchical structure of the clustered articles is displayed in the left half 101 of a screen image representing the search system interface C. In this example, a cluster labeled "Gene" is selected (103). Accordingly, four out of the ten articles taken over, which belong to the cluster, are displayed in the right half 102 of the screen image representing the search system interface C.

As mentioned above, the present invention can be adapted to a case where all articles are not always displayed by a transfer destination or a successor.

Figure 14:
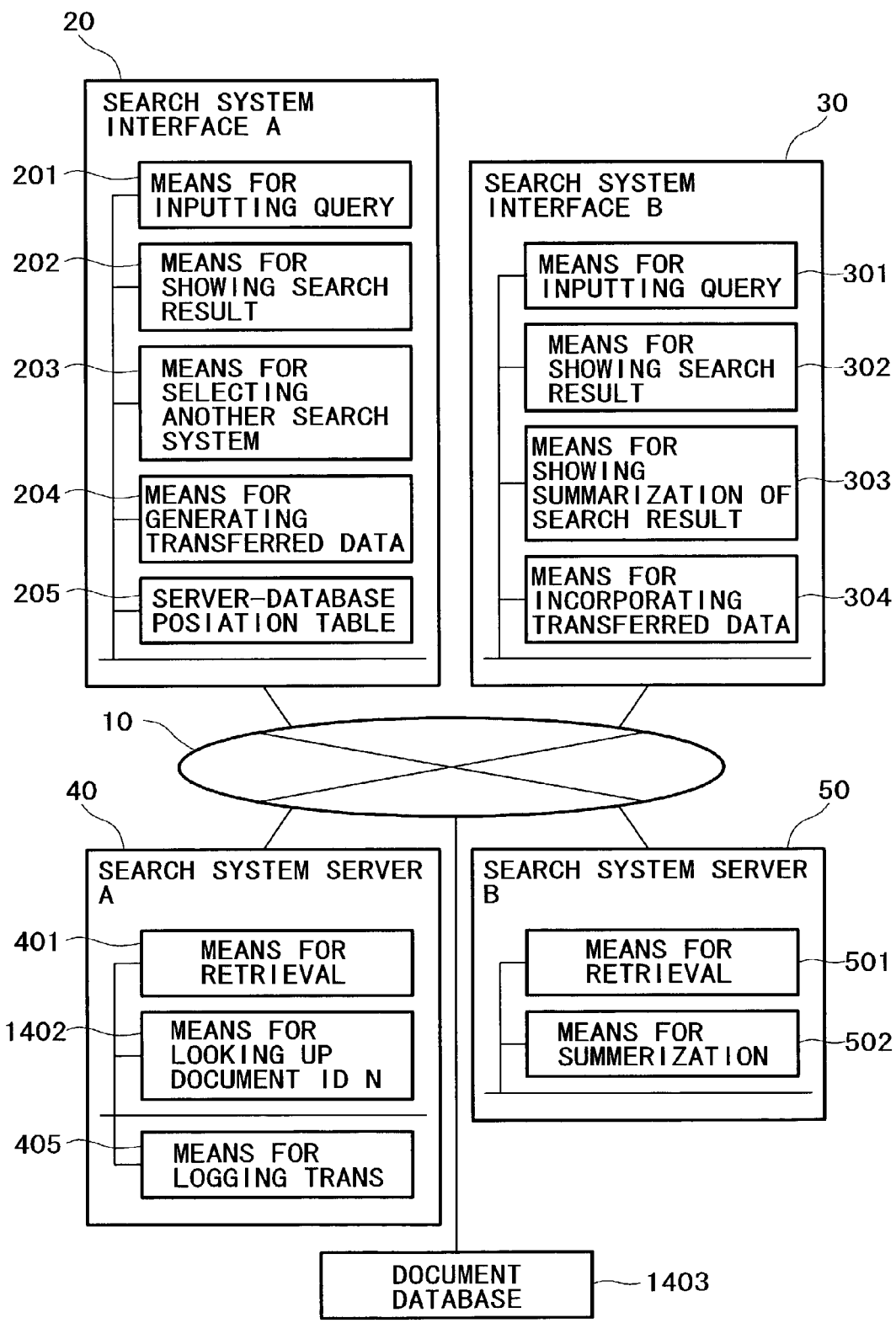
FIG. 14 shows an example of an operating environment in which a database is used in common.
Figure 15:
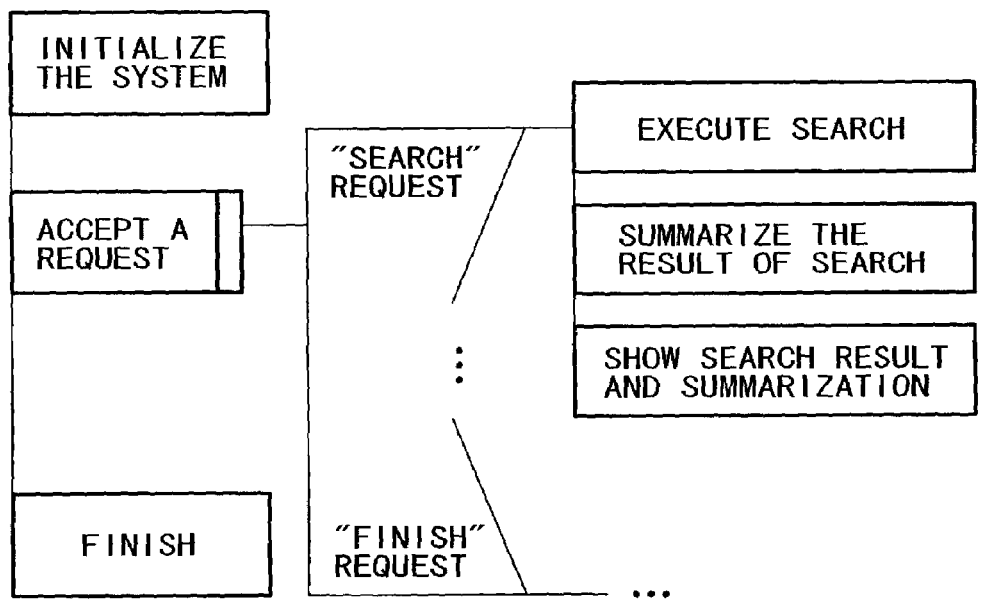
FIG. 15 shows an example of a normal search system program.
Figure 16:
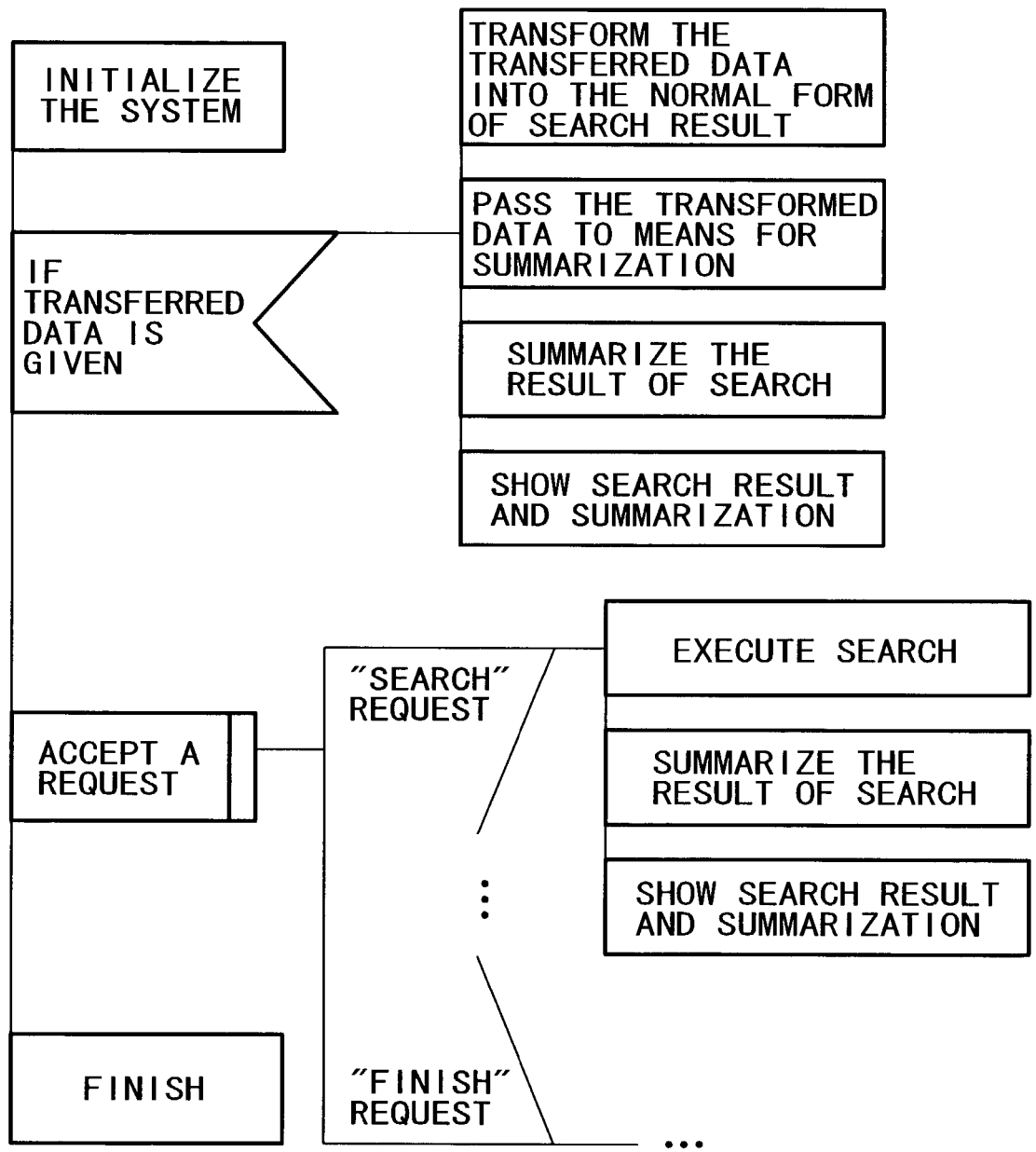
FIG. 16 shows a case (part) where a search system can receive and display search takeover data when being activated.
Figure 17:
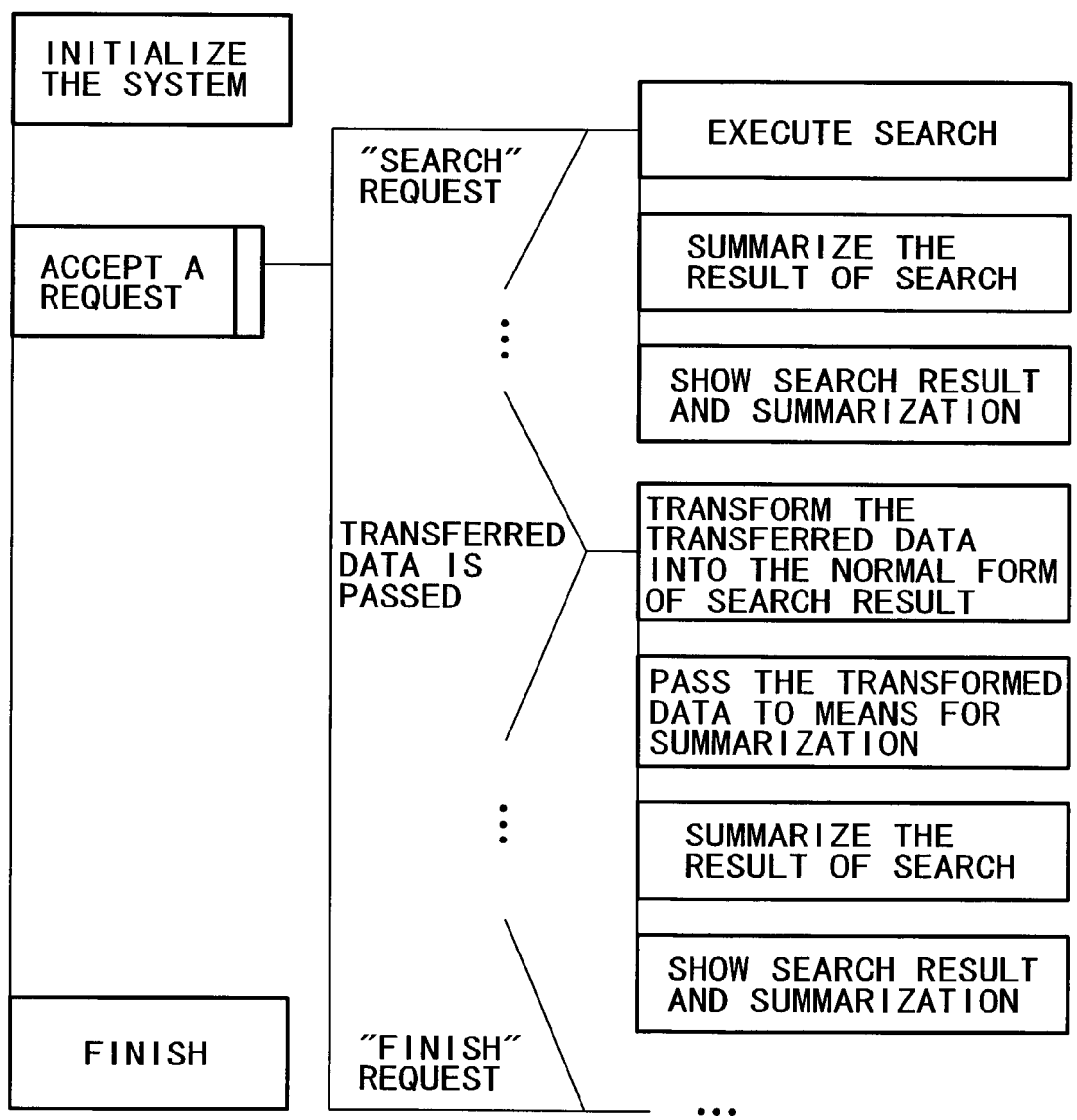
FIG. 17 shows a case (part) where a search system can receive and display search takeover data when running.

FIG. 14 shows an example of an operation environment in which a search system server A and a search system server B share the same document database. In this case, the search system server A and search system server B share a document database 1043 accommodated by a network 10. Since the document database is the same between the servers A and B, document identifiers are used in common. Therefore, a document identifier associating means N1402 merely instructs the document identifier correspondence querying means (2042 in FIG. 6) to convert nothing. Furthermore, the document identifier associating means N1402 may be excluded. In this case, correction must be performed in order to correctly count the number of times by which search is taken over. The correction can be readily achieved supposing every time a user transfers one search system to another, the document identifier correspondence querying means 2042 notifies the search system server A of the fact.

A user displays the results of search performed by a certain search system using another search system whose features are different from those of the search system. Consequently, the user can review the same results of search from a different viewpoint. Eventually, the user can acquire valuable information that cannot be provided by a single search system, and have an in-depth understanding of the results of search.

The foregoing invention has been described in terms of preferred embodiments. However, those skilled, in the art will recognize that many variations of such embodiments exist. Such variations are intended to be within the scope of the present invention and the appended claims.

What is claimed is:

1. A search system comprising:
   a first search server connected to a first database;
   a second search server connected to a second database;
   a third server connected to said first and second search servers;
   a display means for displaying a screen image representing a first search interface included in said first search server and a screen image representing a second search interface included in said second search server;
   a switching means for switching connections to said first and second search servers, wherein:
   said third server an electronic digital computer including a means for producing a transfer data table for converting a first ID in the first database to a corresponding second ID in the second database, said transfer data table is used to display results of a first search at said second search interface, wherein said results of the first search have been acquired by said first search interface, wherein
   said third server includes a document identifier reading means for reading first document identifiers, said identifiers are assigned to the results of the first search displayed through said first search interface and the results of the first search, and
   a document identifier correspondence querying means for querying said second search server about second document identifiers which are displayed through said second search interface and which are associated with the results of the first search displayed through said first search interface; and wherein said means for producing a transfer data table includes the first document identifiers, second document identifiers, and the results of the first search.

2. A search system according to claim 1, wherein a switch button is displayed for use in displaying the results of the first search, which are provided through said first search interface, through said second search interface.

3. A search system according to claim 1, wherein uniform resource locators (URLs) at which the results of search exist are adopted as the first document identifiers.

4. A search system according to claim 1, further comprising; a communicating means for transferring the transfer data table to said second search server when said first search interface is switched to said second search interface.

5. A search system according to claim 2, further comprising: a memory means for storing a search keyword entered through said first or second search interface, and a control means for automatically inputting the search keyword stored in said memory means to said second interface when said first search interface is switched to said second search interface.

6. A search system according to claim 1, further comprising: a means for producing a sum of sets of the results of the first search provided through said first interface and results of a second search provided through said second interface, and a means for producing a data table for use in displaying the sum of sets through said first or second search interface.

7. A search system according to claim 6, further comprising a means for producing a subset from the sum of sets, said subset belonging to the results of at least one of the first and second searches provided through said first or second search interface, wherein the subset and a difference between the sum of sets and subset are displayed on said display means according to different displaying methods.

8. A search system according to claim 1, further comprising: a designating means for designating any range of the results of search provided through said first interface, wherein the results of search within the range designated using said designating means are displayed through said second search interface.

* * * * *